Feb. 6, 1962 A. F. GAVIN 3,019,646
OXYGEN METER FITTING
Filed Oct. 10, 1960
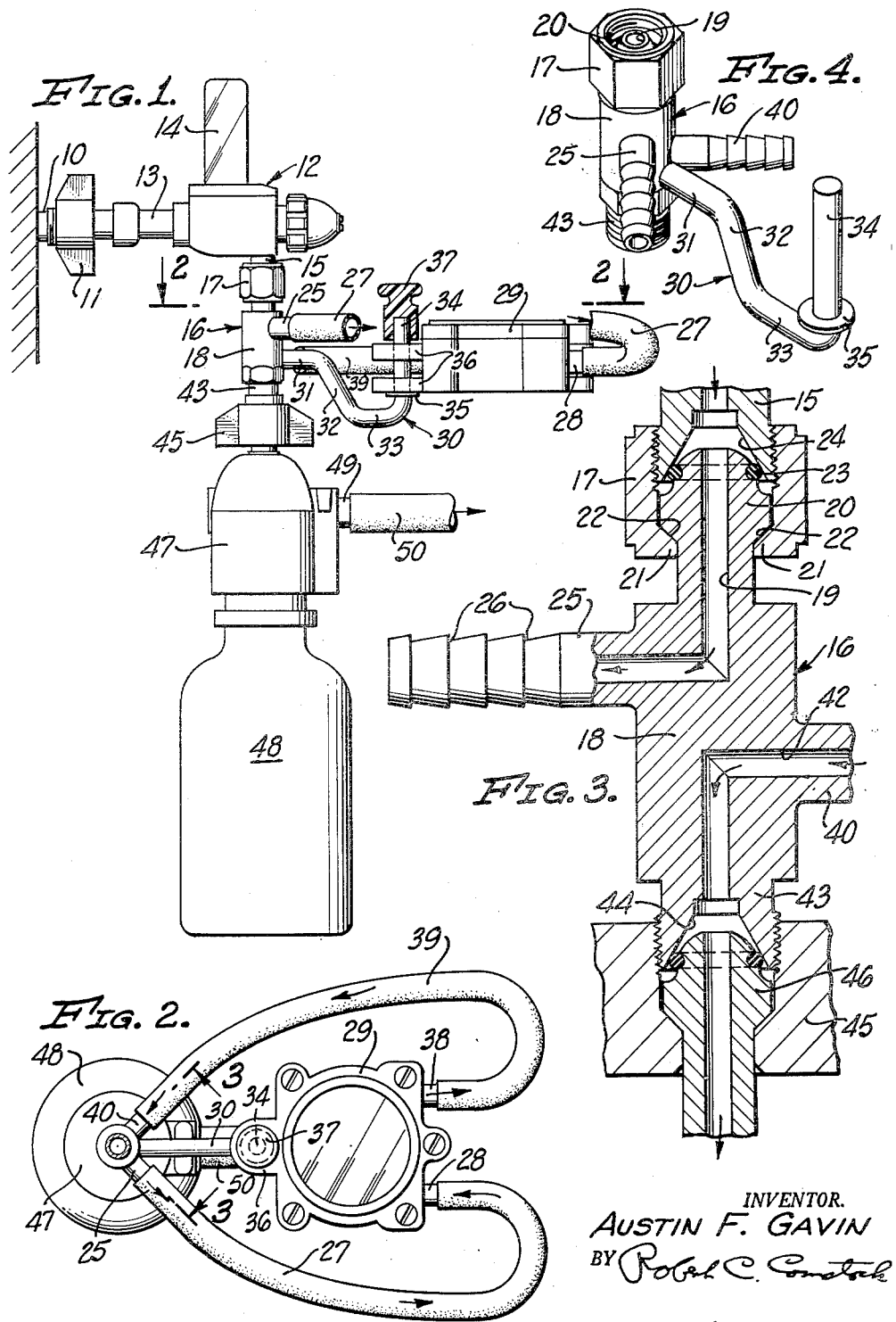
INVENTOR.
AUSTIN F. GAVIN
BY Robert C. Comstock
ATTORNEY

United States Patent Office 3,019,646
Patented Feb. 6, 1962

3,019,646
OXYGEN METER FITTING
Austin F. Gavin, P.O. Box 1810, Santa Ana, Calif.
Filed Oct. 10, 1960, Ser. No. 61,708
5 Claims. (Cl. 73—201)

This invention relates to a fitting for connecting the oxygen supply line of a hospital to a meter for the purpose of measuring and obtaining a record of the amount of oxygen which is used by a patient.

Oxygen in hospitals was formerly supplied in the form of individual tanks which were brought to the room of the patient. The quantity of oxygen consumed could accordingly be easily obtained without requiring the use of meters or other measuring devices. More recently, however, oxygen is supplied from a central system having a wall outlet in each room of the hospital. The central system provides no means for determining the amount of oxygen which is withdrawn from the system by any one room.

In supplying the oxygen to the patient, a catheter is customarily inserted in the throat of the patient. The oxygen as supplied is completely free from moisture and the catheter acts to by-pass the moisture providing areas of the upper respiratory tract. In order to avoid undesirable dehydration, it is accordingly necessary to add moisture to the oxygen before it reaches the patient. This is customarily done by first passing the oxygen through a humidifier, which adds moisture to the oxygen. The oxygen then passes through the volume meter, which measures the amount of oxygen consumed by the patient, and passes from the volume meter to the patient.

This arrangement has often proved to be unsatisfactory in the past because moisture from the humidifier has an adverse effect upon the delicate mechanism of the volume meter.

It is accordingly an object of my invention to provide an oxygen meter fitting which overcomes this problem by mounting the volume meter in such relationship to the humidifier that the oxygen passes through the volume meter before the moisture is added to it, thus preventing the deleterious effects of moisture on the volume meter.

Another object of my invention is to provide an oxygen meter fitting which provides a convenient and effective mounting for the volume meter and which is particularly adapted for convenient use together with the oxygen supply systems, rate of flow meters, volume meters and humidifiers now in use in hospitals so that no changes in or additions to existing equipment are required.

It is a further object of my invention to provide a device of the type described which is simple in its construction and operation so that it is easy to install and use and is economical to manufacture.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, FIG. 1 is a side elevational view, partly in section, of my oxygen meter fitting in use with an oxygen wall outlet, rate of flow meter, humidifier and volume meter;

FIG. 2 is a top plan view of the same, taken on line 2—2 of FIG. 1;

FIG. 3 is a sectional view of the same, taken on line 3—3 of FIG. 2; and

FIG. 4 is a perspective view of my oxygen meter fitting.

A preferred embodiment which has been selected to illustrate my invention is adapted to be used with either a piped wall outlet system or an oxygen tank, providing that a pressure reducing valve is used ahead of the rate of flow meter in order to reduce the high pressure of the oxygen cylinder to a lower pressure comparable to that used in wall outlet systems. Since the wall outlet system is being more commonly used at the present time, my invention is shown in the drawings in use with a wall outlet system.

The oxigen is supplied from an externally screw threaded wall outlet 10, to which there is connected an internally threaded wing nut 11, which is part of a flow meter fitting 12. The flow meter fitting 12 is conventional and includes a horizontally directed inlet 13, a rate of flow meter 14 and a downwardly directed outlet 15, which is externally screw threaded.

My oxygen meter fitting 16 carries at its upper end an internally screw threaded nut 17, which is adapted to fit the external screw threading of the outlet 15 of the flow meter fitting 12. In this regard, all of the threading of my fitting 16 follows the established diameters and specifications which are set for threaded connectors for low pressure gases and which are uniformly followed in hospital oxygen equipment. My fitting is accordingly adapted for use with the various units of hospital oxygen equipment which are now in use.

Beneath the nut 17, my fitting 16 includes a vertically directed body portion 18. A right angular inlet passageway 19 extends through the upper end of the body portion 18. The upper end of the inlet passageway 19 extends through an inlet member 20, which extends upwardly from the body portion 18 and is disposed within the nut 17. The nut 17 is freely mounted for rotation around the inlet member 20, but cannot be removed because its inwardly directed lower portion 21 fits around the flared portion 22 of the inlet member 20. The upper end of the inlet member 20 carries an O-ring 23, which is adapted to seat against the frusto-conical inner surface 24 of the outlet 15 of the flow meter fitting 12.

The opposite horizontally directed portion of the inlet passageway 19 extends through an inlet connector 25, which extends horizontally outwardly from the upper part of the body portion 18 and which is preferably formed integrally therewith. The inlet connector 25 carries adjacent its outer end a series of spaced serrations 26 which are adapted to grip the inner surface of an inlet tube 27, which is formed of conventional latex surgical tubing. One end of the inlet tube 27 is fitted over the end of the inlet connector 25 and is held by resilient engagement with the serrations 26. The opposite end of the inlet tube 27 is similarly connected to the inlet 28 of a volume meter 29. The volume meter 29 is supported by a meter support 30, which is preferably formed integrally with my fitting 16. The meter support 30 comprises a circular rod which includes a first horizontal portion 31 which extends outwardly from the lower part of the body portion 18, an angular portion 32 which extends angularly downwardly from the outer end of the first horizontal portion, a second horizontal portion 33 which extends horizontally outwardly from the outer end of the angular portion 32 and a vertical portion 34 which extends vertically upwardly from the outer end of the second horizontal portion 33. A circular washer-like ring 35 is formed integrally with the meter support 30 and extends around the lower end of the vertical portion 34.

In use, the volume meter 29 is provided with a pair of horizontally directed flanges 36 which have aligned circular openings therein. The vertical portion 34 of my meter support 30 is dimensioned to fit within these openings, with the ring 35 being disposed beneath and supporting the bottom flange 36. The upper end of the vertical portion 34 extends above the uppermost flange 36 and is provided with a friction fit cap 37.

The volume meter 29 includes an outlet 38, to which one end of an outlet tubing 39 is connected. The other end of the outlet tubing 39 is connected to an outlet connector 40, which is preferably formed integrally with my fitting 16. The outer portion of the outlet connector 40 is provided with external serrations similar to the serrations 26 of the inlet connector 25.

A right angular outlet passageway 42 extends through the outlet connector 40 horizontally into the body portion 18 and then downwardly through an outlet member 43. The outlet member 43 is externally screw threaded on its outer wall and internally tapered at 44 on its inner wall to receive and engage the internally threaded wing nut 45 and connector 46 of a humidifier 47. The humidifier 47 is conventional in its structure and includes a water bottle 48 and means for passing the oxygen through the water in the bottle 48 and then out through a horizontally directed outlet 49. A tube 50 is connected at one end to the outlet 49 and carries the oxygen from the humidifier to the patient.

In use, the parts of the oxygen supply system are arranged in the manner shown and described and the oxygen flows from the wall outlet 10 through the inlet 13 to operate the rate of flow meter 14, then through the outlet 15 into the inlet passageway 19 of my fitting 16. It then flows through the inlet connector 25 and inlet tube 27 through the volume meter 29 and back through the outlet tubing 39 to the outlet connector 40 of my fitting 16. It then flows through the outlet passageway 42 to the humidifier 47 and then through its outlet 49 to the tube 50 and to the patient. The volume meter 29 is thus protected from moisture from the humidifier 47 and is simultaneously held in a convenient position for its effective use and operation.

I claim:

1. An oxygen volume meter fitting for use in an oxygen supply system having a source of oxygen supply connected to a rate of flow meter carried by a flow meter fitting, a volume meter and a humidifier, said volume meter fitting comprising a body portion, an integral inlet member disposed above said body portion, a nut rotatably mounted on said inlet member, said nut having internal screw threading for connection to said flow meter fitting, a right angular oxygen inlet passageway extending vertically downwardly from the top of said inlet member into said body portion and then horizontally within the upper part of said body portion, a horizontally directed hollow inlet connector formed integrally with and projecting horizontally from said body portion, said inlet passageway extending through said inlet connector, a flexible inlet tube connected at one end to said inlet connector, the other end of said inlet tube adapted to be connected to the input of said volume meter, said fitting having an outlet connector disposed beneath said inlet connector, said outlet connector being formed integrally with and projecting horizontally from said body portion at substantially a right angle with respect to said inlet connector, a flexible outlet tube connected at one end to said outlet connector, the other end thereof adapted to be connected to the output of said volume meter, a right angular oxygen outlet passageway extending horizontally through said outlet connector and into the lower part of said body portion and then vertically downwardly within said body portion to the lower end thereof, an outlet member formed integrally with said body portion and disposed at the bottom thereof, said outlet passageway having an open lower end at the bottom of said outlet member, said outlet member having external screw threading extending therearound for connection to said humidifier, a meter support comprising an elongated rod fixedly connected at one end to the side of said body portion adjacent to and substantially between said inlet and outlet connectors, said meter support having a first horizontal portion extending substantially horizontally from said body portion, an angular portion extending angularly downwardly from the outer end of said first horizontal portion, a second horizontal portion extending horizontally from said angular portion and an elongated straight vertical portion extending upwardly from said second horizontal portion, a washer-like ring fixedly secured to said meter support adjacent the lower end of said vertical portion, said vertical portion and ring being adapted to support and hold said meter adjacent to said fitting so that oxygen flows from said rate of flow meter fitting into said inlet passageway, then through said volume meter and through said outlet passageway to said humidifier to protect said volume meter from damage by moisture added to the oxygen by said humidifier.

2. An oxygen volume meter fitting for use in an oxygen supply system having a source of oxygen supply connected to rate of flow meter carried by a flow meter fitting, a volume meter and a humidifier, said volume meter fitting comprising a body portion, an integral inlet member disposed above said body portion, a nut rotatably mounted on said inlet member, said nut having internal screw threading for connection to said flow meter fitting, a right angular oxygen inlet passageway extending vertically downwardly from the top of said inlet member into said body portion and then horizontally within the upper part of said body portion, a horizontally directed inlet connector projecting from said body portion, said inlet passageway extending through said inlet connector, an inlet tube connected at one end to said inlet connector, the other end of said inlet tube adapted to be connected to the input of said volume meter, said fitting having an outlet connector projecting from said body portion beneath said inlet connector, an outlet tube connected at one end to said outlet connector, the other end thereof adapted to be connected to the output of said volume meter, a right angular oxygen outlet passageway extending horizontally through said outlet connector and into the lower part of said body portion and then vertically downwardly within said body portion to the lower end thereof, an outlet member formed integrally with said body portion and disposed at the bottom thereof, said outlet passageway extending through said outlet member, said outlet member having external screw threading extending therearound for connection to said humidifier, a meter support comprising an elongated rod connected at one end to said body portion, said meter support having a first horizontal portion extending substantially horizontally from said body portion, said meter support having an angular portion extending angularly downwardly from the outer end of said first horizontal portion, a second horizontal portion extending horizontally from said angular portion and a straight vertical portion extending upwardly from said second horizontal portion, a ring carried by said meter support adjacent the lower end of said vertical portion, said vertical portion and ring being adapted to support and hold said meter adjacent to said fitting so that oxygen flows from said rate of flow meter fitting into said inlet passageway, then through said volume meter and through said outlet passageway to said humidifier to protect said volume meter from damage by moisture added to the oxygen by said humidifier.

3. An oxygen volume meter fitting for use in an oxygen supply system having a source of oxygen supply connected to a rate of flow meter, a volume meter and a humidifier, said fitting comprising a body portion, a right angular oxygen inlet passageway extending vertically and then horizontally within the upper part of said body portion, means carried by the upper end of said body portion for connecting the upper end of said inlet passageway to said rate of flow meter, a horizontally directed inlet connector projecting from said body portion, said inlet passageway extending through said inlet connector, means for connecting said inlet connector to the input of said volume meter, an outlet connector projecting from said body portion and disposed beneath said inlet connector, means for connecting said outlet connector to the output of said volume meter, a right angular oxygen outlet passageway extending horizontally and then vertically within the lower part of said body portion, said outlet passageway extending through said outlet connector, means carried by the lower end of said body portion for connecting said outlet passageway to said humidifier, a meter support comprising an elongated rod connected at one end to said body portion, said meter support having an elongated straight vertical portion spaced substantially outwardly from said body portion, said vertical portion being adapted to support said volume meter adjacent to said fitting so that oxygen flows from said rate of flow meter into said inlet passageway, then through said volume meter and through said outlet passageway to said humidifier to protect said volume meter from damage by moisture added to the oxygen by said humidifier.

4. An oxygen volume meter fitting for use in an oxygen supply system having a source of oxygen supply connected to a rate of flow meter, a volume meter and a humidifier, said fitting comprising a body portion, an oxygen inlet passageway disposed within the upper part of said body portion, means carried by the upper end of said body portion for connecting one end of said inlet passageway to said rate of flow meter, means for connecting the other end of said inlet passageway to the input of said volume meter, an oxygen outlet passageway disposed within the lower part of said body portion, means for connecting one end of said outlet passageway to the output of said volume meter, means carried by the lower end of said body portion for connecting the opposite end of said outlet passageway to said humidifier, a meter support connected at one end to said body portion, said meter support having a vertical portion spaced substantially outwardly from said body portion, said vertical portion being adapted to support said volume meter so that oxygen flows from said rate of flow meter into said inlet passageway, then through said volume meter and through said outlet passageway to said humidifier to protect said volume meter from damage by moisture added to the oxygen by said humidifier.

5. An oxygen volume meter fitting for use in an oxygen supply system having a source of oxygen supply connected to a rate of flow meter, a volume meter and a humidifier, said fitting comprising a body portion, an oxygen inlet passageway disposed within said body portion, means carried by said body portion for connecting one end of said inlet passageway to said rate of flow meter, means for connecting the other end of said inlet passageway to the input of said volume meter, an oxygen outlet passageway disposed within said body portion, means for connecting one end of said outlet passageway to the output of said volume meter, means carried by said body portion for connecting the opposite end of said outlet passageway to said humidifier, a meter support connected at one end to said body portion, said meter support having a portion spaced substantially outwardly from said body porton and adapted to support said volume meter so that oxygen flows from said rate of flow meter into said inlet passageway, then through said volume meter and through said outlet passageway to said humidifier to protect said volume meter from damage by moisture added to the oxygen by said humidifier.

References Cited in the file of this patent

UNITED STATES PATENTS

| | | |
|---|---|---|
| 953,505 | Bassett | Mar. 29, 1910 |
| 2,267,009 | Adolphsen | Dec. 23, 1941 |